(12) United States Patent
Reedy

(10) Patent No.: US 6,914,763 B2
(45) Date of Patent: Jul. 5, 2005

(54) UTILITY CONTROL AND AUTONOMOUS DISCONNECTION OF DISTRIBUTED GENERATION FROM A POWER DISTRIBUTION SYSTEM

(75) Inventor: Irving Reedy, Apopka, FL (US)

(73) Assignee: Wellspring Heritage, LLC, Reno, NV (US)

( * ) Notice: Subject to any disclaimer, the term of this patent is extended or adjusted under 35 U.S.C. 154(b) by 105 days.

(21) Appl. No.: 10/211,475

(22) Filed: Aug. 5, 2002

(65) Prior Publication Data

US 2003/0133238 A1 Jul. 17, 2003

Related U.S. Application Data

(60) Provisional application No. 60/348,912, filed on Jan. 15, 2002.

(51) Int. Cl.[7] ................................................. H02H 7/26
(52) U.S. Cl. ............................................. 361/64; 64/81
(58) Field of Search ........................... 361/64, 66, 68, 361/81; 340/310.01

(56) References Cited

U.S. PATENT DOCUMENTS

| | | | | |
|---|---|---|---|---|
| 4,471,399 A | * | 9/1984 | Udren | 361/64 |
| 5,021,779 A | * | 6/1991 | Bisak | 340/825.69 |
| 5,434,738 A | * | 7/1995 | Kurszewski et al. | 361/23 |
| 5,530,431 A | * | 6/1996 | Wingard | 340/568 |
| 5,892,645 A | * | 4/1999 | Watanabe et al. | 361/85 |
| 5,973,481 A | | 10/1999 | Thompson et al. | |
| 6,002,260 A | | 12/1999 | Lau et al. | |
| 6,453,248 B1 | * | 9/2002 | Hart et al. | 702/58 |
| 6,459,998 B1 | * | 10/2002 | Hoffman | 702/62 |

* cited by examiner

*Primary Examiner*—Brian Sircus
*Assistant Examiner*—Zeev Kitov
(74) *Attorney, Agent, or Firm*—James H. Beusse; Beusse Brownlee Wolter Mora & Maire, P.A.

(57) ABSTRACT

In a utility power distribution system having at least one primary electric power source and at least one secondary electric power source, each of said primary and secondary sources being connected to the distribution system through respective controllable circuit breakers, the improvement comprising communication signal generating apparatus arranged for introducing a communication signal into the power distribution system from the connection of the primary power source, communication signal receiving apparatus arranged for receiving the communication signal via the power distribution system at the secondary power source, and apparatus responsive to the interruption of receipt of the communication signal at the receiving apparatus for operating the circuit breakers at the secondary power source for disconnecting the secondary power source from the power distribution system.

3 Claims, 2 Drawing Sheets

UTILITY CONTROL AND AUTONOMOUS DISCONNECTION OF DISTRIBUTED GENERATION FROM A POWER DISTRIBUTION SYSTEM

SPECIFIC DATA RELATED TO THE INVENTION

This application claims benefit of U.S. provisional application Ser. No. 60/348,912 filed Jan. 15, 2002.

BACKGROUND OF THE INVENTION

This invention relates to an electric power generation system and, more particularly, to a method and system for disconnecting a distributed power generation unit from a power distribution system.

An electric power system of a country, such as the United States, typically consists of large, regional power systems interconnected to form an electric power grid or circuit. Primary electric power in any region is provided by a government-regulated electric utility company, which may be investor owned, membership owned, or government owned. A regional grid is dynamic and may comprise a plurality of distributed generation units, or producers of electrical power that are directly connected to a power distribution system or grid that is privately owned and maintained by entities other than the electric utility company. For example, some manufacturers, or even individuals, may have their own power generation equipment and may at times have excess capacity which, by law, can be sold to the power utility company. For this reason, electric power grids are growing increasingly complex and interconnected, with a greater number of power buyers and sellers making a burgeoning number of transactions. Distributed generation units may be conventional generators driven by reciprocating engines, turbine engines, micro turbines, water turbines or wind turbines. Distributed generation units may also be energized by fuel cells, photovoltaic panels, or other energy conversion technologies.

The larger distributed generation units are typically interconnected in parallel with an existing electric utility grid through radial distribution circuits at distribution voltage levels. Other smaller distributed generation units interconnect in parallel with the electric utility grid on a secondary, or low voltage side of a transformer.

Safety of the general public is greatly compromised when an overhead distribution or transmission line conductor falls to the ground. When such a condition exists, power must be quickly interrupted from all sources supplying power to the downed conductor. The primary electric utility company has control over power flowing from its transmission system and can interrupt this power, typically by opening a circuit breaker. However, the primary electric utility company may not have control over other distributed generation units which may be coupled to the downed conductor or to the power distribution lines downstream of the downed or broken conductor. Consequently, the grid in the area of the downed conductor may remain energized even though the primary power to the area has been interrupted. Thus, the electric utility, which owns and operates the downed distribution line, may not have the necessary control over de-energizing, or shutting down the flow of electricity from or through, all sources of power connected to the distribution line.

During certain maintenance and construction activities, electric line crews need to know, with certainty, that an electric power distribution line is de-energized and cannot be re-energized without their prior knowledge. When a source of electric power is from a single point, such as with a traditional electric system, line crews can easily isolate the circuit and safely perform the necessary work. However, when distributed generation units are connected to supply electrical power, line crews need to be alert to the possibility of energization of a circuit otherwise thought to be de-energized, due to the presence of electrical power from a distributed generator unit.

Additionally, while performing line maintenance, crews sometime need to be able to positively identify each phase of the 3-phase AC system, at any point along a distribution line. Since there is no physical difference between the different phase conductors, no simple visual identification is possible. Line maintenance crews currently use elaborate methods of tracing the orientation of the conductors from the source substation, and when physical tracing is not possible, such as when sections of the lines are underground, the crew must depend on rules of construction, such as identification based on orientation from top to bottom or left to right of the distribution line.

When a temporary fault occurs on a distribution circuit, power must be interrupted from all sources at effectively the same time in order for the fault to be cleared and service restored. Standard electric utility practice accomplishes this objective automatically through control equipment which senses the fault condition, de-energizes the circuit, typically by opening a substation circuit breaker which interrupts power flow from the only source, and re-energizes the circuit when the fault has cleared, usually by automatically closing the circuit breaker. If the circuit includes distributed generation units, those remote sources of energy may continue to feed the fault condition unless there is control circuitry at each various distributed generation unit to detect the fault condition and/or the isolated condition of the circuit, and execute a shutdown or disconnect. The electric utility, which is responsible for the circuit's quick and reliable return to service, has been dependent on the designers and/or operators of the distributed generator units to be able to detect the abnormal condition and to react accordingly.

Once a power outage occurs in an electric power grid, restoration may be a difficult and lengthy process, possibly requiring many hours. Accordingly, control of many grid operating parameters is carefully monitored, and maintained rigorously by agreement of the system operators and various regulatory agencies. Examples of these parameters include system voltage levels, system frequency, and power flows on transmission lines, all which are affected by the output and location of distribution generator units. While increases in power generated by distributed generation units can be communicated through normal means, a need sometimes arises for a grid operator to reduce or shutdown a distributed generation unit abruptly, yet in an orderly manner, to prevent overloading of lines, overfrequency, overvoltage, or other conditions which can cause or exacerbate major system disruptions. If a significant portion of the generation of the interconnected system comes from distributed generation units, conventional control and communication channels may not be adequate for the required control.

When the control system of the distributed generation unit must rely on detection of certain anomalous conditions of the utility distribution line before recognizing the necessity of immediate isolation from the circuit, it is often too late, and the conditions too severe, to maintain the normal output of the distributed generation unit or generator. The distributed generation unit must shut down, and wait a period of time, which may range from several minutes to hours, before restarting the generator for the purposes of supplying emergency power to the facility. If the owner of the distributed generation unit depends on this generator for emergency power supply when the normal utility supply is disrupted, this sequence is operationally undesirable, and may cause economic hardship, such as loss of product or services.

SUMMARY OF THE INVENTION

The present invention is directed to a system and method for disconnecting power distributed generation units from a faulted power line, such as upon occurrence of a broken conductor, or whenever the primary electric utility power supplier determines that it is necessary to disconnect distributed generation units from the power grid. The invention is applicable to a system which comprises a power distribution system to which both a primary electric utility company and one or more distributed power generation units are supplying alternating current (AC) power. In one form, the system includes at least one control signal transmitter for transmitting a control signal over each of a plurality of individual power lines of the power distribution system. The transmitters may be connected such that there is a specific transmitter for each phase of a 3-phase power system with each transmitter transmitting a unique signal associated with that particular phase or the system may be set up such that the same signal is transmitted on each phase of the power distribution system. At each distributed generation unit there is provided a control signal receiver for receiving the signals generated by the transmitters. The control signal receivers are connected to a control system that is coupled to a set of circuit breakers or switches that can be used to disconnect the distributed power generation unit from the electric power utility system.

In one form, each of the control signal receivers is coupled to the control system such that these circuit breakers or switches cannot be closed unless the control signals are present on the primary utility electric power lines. Further, any interruption or significant reduction in the control signals will cause the control system to immediately disconnect the distributed power generation unit from the electric power utility system. The control signals are preferably transmitted over the electric power utility lines so that any break in the power lines will result in interruption of the control signal and thereby disconnect the distributed power generation units from the electric power utility system. As noted above, the system may be set up in a 3-phase configuration utilizing a common signal for all three phases in which event any interruption of any one phase will immediately cause all three phases to be interrupted at the distributed power generator unit. Alternatively, the system can be adapted such that three or more separate control signals are provided and only the particular phase which is involved in the faulted condition would be interrupted. However, this ladder of configuration is not a preferred configuration since cross-coupling of electric power through 3-phase transformers may result in energization of the faulted conductor if only one phase is interrupted. Note also that linemen may be provided with portable signal detectors to troubleshoot signal problems on the grid and identify the three phases throughout the distribution system. Electricians may use such portable signal detectors to identify phases within building electric systems.

BRIEF DESCRIPTION OF THE INVENTION

The features and advantages of the present invention will become apparent from the following detailed description of the invention when read with the accompanying drawings in which.

DETAILED DESCRIPTION OF THE INVENTION

Figure 1:
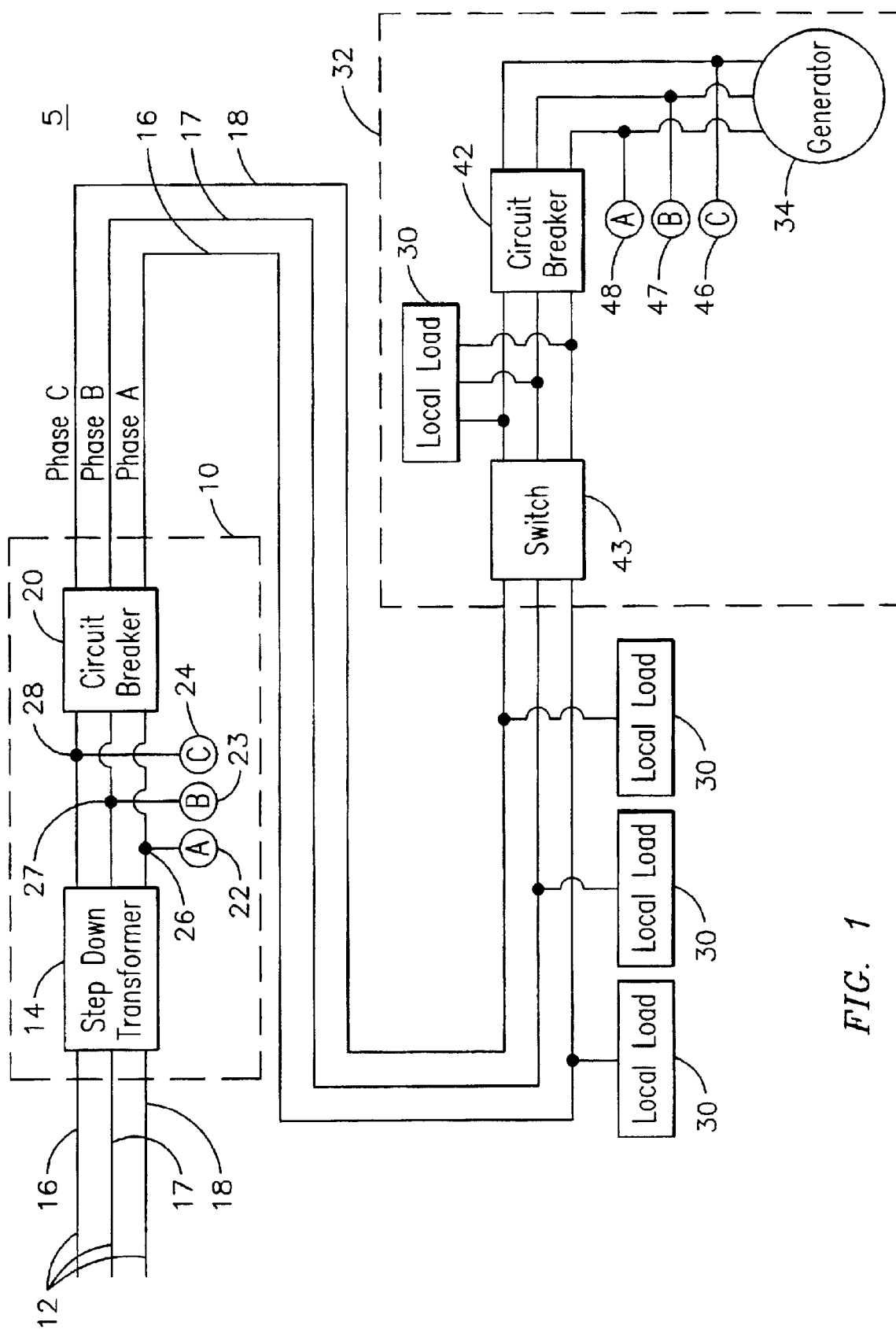
FIG. 1 is an exemplary detailed block diagram of the present invention.

FIG. 1 is an exemplary block diagram of one form of the present invention. As is well known, a primary electric utility power company supplies electric power to elements of an electric power grid through a plurality of substations such as an electric utility substation 10. The electrical power is supplied through electrical utility transmission lines 12 from a source, such as a coal fired or nuclear power plant, to the electric utility substation 10. In the electric utility substation 10, the electrical power is supplied to transformers 14, where the voltage is stepped down, typically from the tens or hundreds of thousands of volts range, to a lower voltage, typically less than 30,000 volts. The stepped down electrical power is then fed through one or more circuit breakers 20 to the local distribution circuit represented by conductor lines 16, 17 and 18. As is well known, the electric power is distributed as three-phase AC power.

The present invention incorporates control signal transmitters or communication signal generating apparatus or devices 22, 23, and 24 coupled respectively to each phase 16, 17, 18 of the three-phase AC power lines. In one embodiment, each of the transmitters 22, 23, 24 generates a unique frequency. In another form, each transmitter may generate signals having the same characteristic or the system may use a single transmitter to produce signals for introduction on all conductor lines 16, 17, 18. Preferably, transmitters 22, 23, 24 are arranged to introduce respective signals 26, 27, 28, each having a different characteristic, between the low side of the step down transformers 14 and the circuit breakers 20. The signals 26, 27, 28 are transmitted at a frequency selected to assure propagation through the distribution power lines, including coupling through further transformers in the system. Selection of such frequencies and methods for coupling and transmitting signals via electric power utility lines are known in the art.

Figure 2:
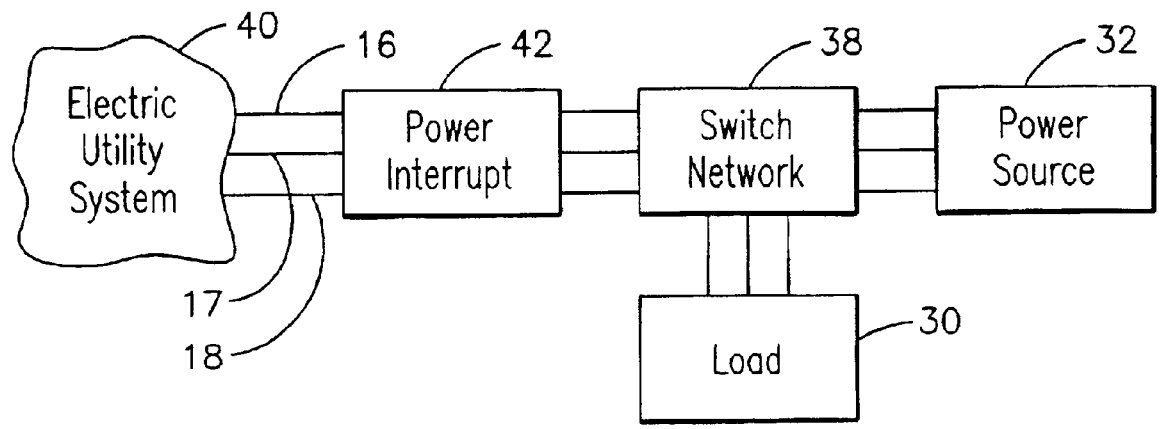
FIG. 2 is an exemplary general block diagram of the present invention.

As is further illustrated in FIG. 2, the power distribution lines 16, 17, 18 supply electric power to various loads 30, which may be single-phase loads or multi-phase loads. Additionally, there may be one or more secondary power generating sources (a distributed power generation unit) such as is shown at 32. Such power generating sources 32 typically comprise a power generator 34 as illustrated in FIG. 1, adapted for supplying power to a local load 30 via switching network 38. During times when the generator 34 is unable to supply all required power to load 30, additional power is drawn from utility grid 40. Conversely, if load 30 requires less power than is being produced by generator 34, the excess power can be coupled through network 38 and introduced into grid 40. Conventional power interrupters 42 are used between network 38 and grid 40 to disconnect the secondary source (or load) 32 from grid 40. The generator 34 and circuit breaker 42 are part of a distributed power substation 32.

In one embodiment, the distributed power substation 32 has control signal receivers or communication signal receiving apparatus or devices 46, 47, 48 that can detect the signals 26, 27, 28 generated by the control signal transmitters 22, 23, 24. Thus, when a signal 26, 27, 28 is not detected by the respective control signal receiver 46, 47, 48, or a significant loss of a signal is detected, the distributed power generation unit 34 is disconnected from the system or is shut down. The distribution generation subsystem 32 further comprises a control system 41, not shown, operating in accordance with a control algorithm and responsive to the interruption of receipt of the signals 26, 27, 28 to properly, or orderly, shut down the generation unit 34, or to disconnect it from the power system, by way of the circuit breaker or power interrupt apparatus 42, or switch 43, whereby any damage to the generation unit 34 is minimized, and flow of power into the system is prevented. Alternatively, the control algorithm may respond to the loss of a signal 26, 27, 28 causing switch 43 to operate so as to isolate the local load 30 and the generation unit 34 together from the system allowing the generation unit 34 to continue running while safely isolated from the faulted utility system. Since the need to restart the distributed generation unit 34 is not as urgent as it may be to shut it down, other communication approaches may be utilized to restart the distributed generation unit 34 once a determination is made to restart it.

Figure 3:
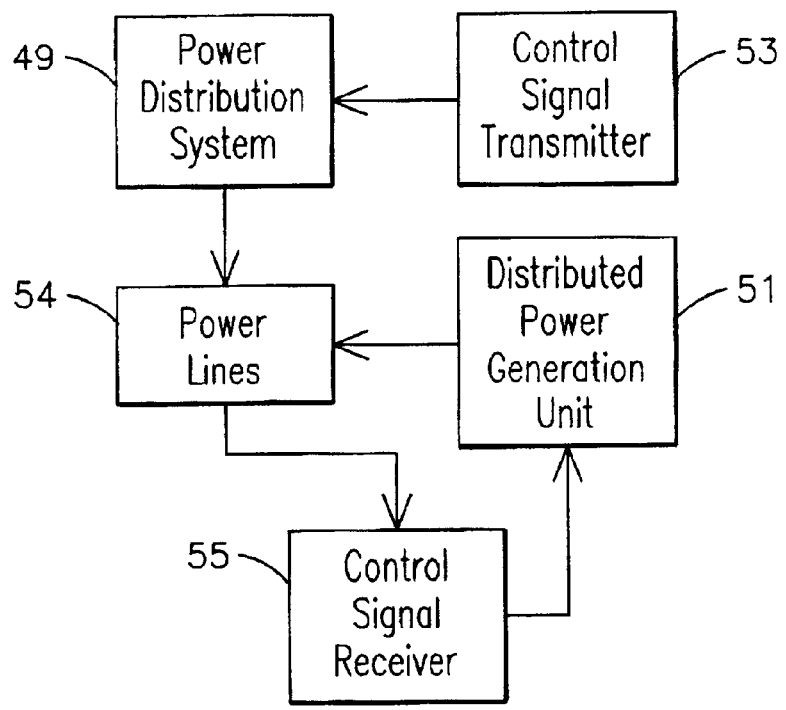
FIG. 3 is an exemplary flow chart of the operation of the present invention.

FIG. 3 describes, in the form of a functional flow chart, the several functions that are implemented in the present invention.

Thus, in operation, a power distribution system, block 49, and a distributed power generation unit, block 51, are connected in a power distribution system. A control signal transmitter, block 53, connected to each phase of a 3-phase AC power distribution system introduces a signal of known characteristics onto the power lines, block 54. A control signal receiver connected to each phase conductor of the power distribution system detects the signals on the power lines, block 55. If the receiver does not detect the control signals, the receiver either disconnects the auxiliary power generation unit from the utility system or inhibits connection to the system.

While the invention has been described in what is presently considered to be a preferred embodiment, many variations and modifications will become apparent to those skilled in the art. For example, the use of portable control signal receivers by a lineman is contemplated within the scope of the invention. The particular design of signal receivers is well known in the art and further description not believed necessary. Accordingly, it is intended that the invention not be limited to the specific illustrative embodiment but be interpreted within the full spirit and scope of the appended claims.

What is claimed is:

1. In a utility power distribution system having at least one primary electric power source and at least one auxiliary electric power source, each of said primary and auxiliary sources being connected to the distribution system through respective controllable circuit breakers, the improvement comprising:

communication signal generating apparatus arranged for introducing a communication signal into the power distribution system from the connection of the primary power source;

communication signal receiving apparatus arranged for receiving the communication signal via the power distribution system at the auxiliary power source; and apparatus responsive to the interruption of receipt of the communication signal at the receiving apparatus for operating the circuit breakers at the auxiliary power source for disconnecting the auxiliary power source from the power distribution system.

2. The improvement of claim 1 wherein the communication signal generating apparatus and the communication signal receiving apparatus are arranged for introducing and receiving, respectively, a unique communication signal for each phase of power.

3. The improvement of claim 1 further comprising a portable control signal receiver for at least one of detecting and identifying the communication signal at a plurality of locations between the communication generation apparatus and the communication receiving apparatus and other locations throughout the electric distribution system.

* * * * *